(12) United States Patent
Smallwood et al.

(10) Patent No.: US 7,131,693 B2
(45) Date of Patent: Nov. 7, 2006

(54) RESTRAINT ANCHORAGE FOR A CHILD RESTRAINT SYSTEM

(75) Inventors: David J. Smallwood, Victoria Harbor (CA); John T. Shier, Penetanguishene (CA); Ronald D. McLeod, Midhurst (CA)

(73) Assignee: M & C Corporation, Sterling Heights, MI (US)

( * ) Notice: Subject to any disclaimer, the term of this patent is extended or adjusted under 35 U.S.C. 154(b) by 0 days.

(21) Appl. No.: 10/439,775

(22) Filed: May 16, 2003

(65) Prior Publication Data

US 2004/0227384 A1 Nov. 18, 2004

(51) Int. Cl.
*A47D 1/10* (2006.01)
*B60R 7/00* (2006.01)

(52) U.S. Cl. ...................... 297/253; 224/275

(58) Field of Classification Search ............... 297/253, 297/452.18, 391; 224/275, 534; 292/340, 292/341, DIG. 64
See application file for complete search history.

(56) References Cited

U.S. PATENT DOCUMENTS

| | | | |
|---|---|---|---|
| 1,647,992 A | 11/1927 | Hartman | |
| 1,690,408 A * | 11/1928 | Hasenflue | 292/340 |
| 2,583,806 A * | 1/1952 | Batzle | 224/275 |
| 3,705,738 A | 12/1972 | Yoshimura | |
| 3,912,315 A | 10/1975 | Yamananaka | |
| 4,838,513 A | 6/1989 | Kondo | |
| 4,896,908 A * | 1/1990 | Kleefeldt | 292/216 |
| D308,627 S | 6/1990 | Guffey | |
| 4,981,313 A | 1/1991 | Makamura | |
| 5,215,342 A * | 6/1993 | Yuge et al. | 292/340 |
| 5,487,588 A | 1/1996 | Burleigh et al. | |
| 5,524,965 A | 6/1996 | Barley | |
| 5,729,951 A | 3/1998 | Frohlich | |
| 5,941,600 A * | 8/1999 | Mar et al. | 297/250.1 |
| 5,975,611 A | 11/1999 | Hoshihara et al. | |
| 6,000,737 A | 12/1999 | Yiu | |
| 6,108,894 A * | 8/2000 | Mizuki et al. | 29/509 |
| 6,155,618 A * | 12/2000 | Ichinose | 292/340 |
| 6,193,310 B1 | 2/2001 | Batalaris et al. | |
| 6,234,572 B1 * | 5/2001 | Shiino et al. | 297/253 |
| 6,276,754 B1 | 8/2001 | Youssef-Agha et al. | |
| 6,334,649 B1 | 1/2002 | Boegge et al. | |
| 6,354,648 B1 * | 3/2002 | Allan et al. | 296/65.03 |
| 6,361,115 B1 | 3/2002 | Aufrere et al. | |
| 6,416,129 B1 | 7/2002 | Hirota | |
| 6,481,800 B1 * | 11/2002 | Duncan | 297/452.2 |
| 6,485,055 B1 * | 11/2002 | Swayne et al. | 280/801.1 |
| 6,499,786 B1 * | 12/2002 | Takahashi | 296/65.03 |
| 6,554,357 B1 * | 4/2003 | Moffa | 297/253 |
| 6,698,080 B1 | 3/2004 | Sawajiri et al. | |
| 2002/0008416 A1 | 1/2002 | Deptolla | |

(Continued)

FOREIGN PATENT DOCUMENTS

AU 43390/79 5/1983

(Continued)

*Primary Examiner*—Peter M. Cuomo
*Assistant Examiner*—Sarah B. McPartlin
(74) *Attorney, Agent, or Firm*—Brooks Kushman P.C.

(57) ABSTRACT

A restraint anchorage for a child safety seat for an automotive vehicle having a cross member disposed behind the vehicle's seat. U-shaped latch wires are attached to the cross member. Collars are provided on the legs of the latch wires which engage one side of the cross members. The ends of the legs which protrude through holes provided in the cross member are peened over to form enlarged heads locking the latch wire to the cross member.

16 Claims, 3 Drawing Sheets

U.S. PATENT DOCUMENTS

| | | |
|---|---|---|
| 2002/0011505 A1 | 1/2002 | Cole et al. |
| 2004/0080194 A1 | 4/2004 | Medvecky et al. |

FOREIGN PATENT DOCUMENTS

| | | |
|---|---|---|
| EP | 0 694 436 A1 | 1/1996 |
| EP | 1 197 378 A1 | 4/2002 |
| EP | 1 336 530 A2 | 2/2003 |
| JP | 2001225681 | 8/2001 |
| JP | 2002211287 A | 7/2002 |
| WO | WO 03/070510 A1 | 8/2003 |

\* cited by examiner

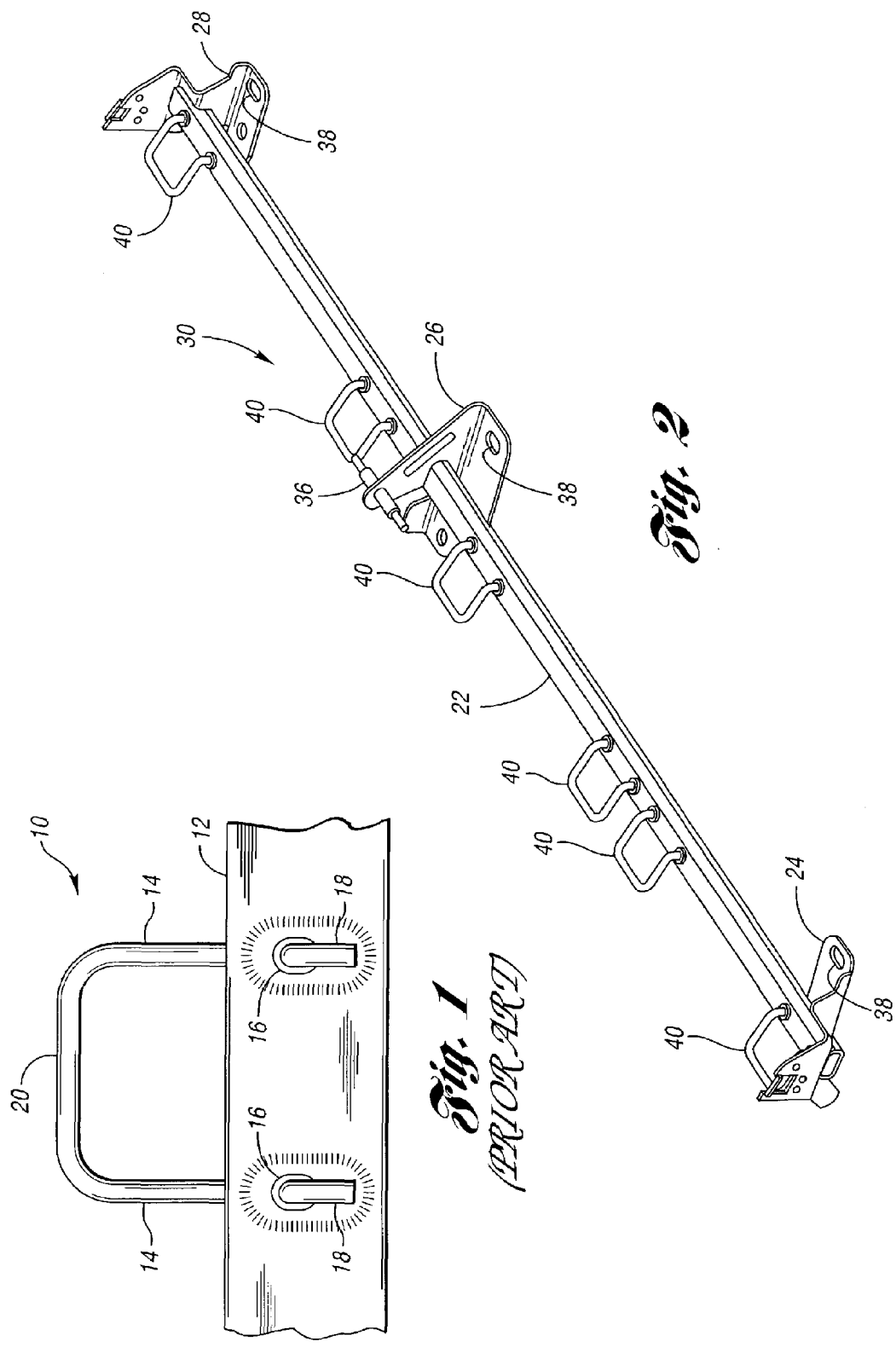

RESTRAINT ANCHORAGE FOR A CHILD RESTRAINT SYSTEM

BACKGROUND OF THE INVENTION

1. Field of the Invention

The invention is related to the field of child seat restraints for automotive vehicles and in particular to a restraint anchorage system for securing the child restraint seat to the seat of a vehicle.

2. Background Art

For many years, child safety seats have been required by law for small children riding in automotive vehicles. In the past, these child safety seats have been secured to a passenger seat using the seat belts provided for adult passengers. These seat belts are anchored to one or more structural members of the vehicle. The seat belts are normally threaded through apertures or slots provided in the child safety seat to secure the child safety seat to the seat of the vehicle. The procedure for mounting these child safety seats is awkward and sometimes complex. As a result, the child safety seat is improperly secured to the seat of the vehicle and the child is not afforded the desired protection in the event of an accident.

To overcome these problems, various regulations have been implemented requiring a standardization of the structure and methods for securing the child safety seat in an automotive vehicle. A new Federal Motor Vehicle Safety Standard requires vehicles be equipped with child seat restraint anchorage systems of the type outlined in the Federal Motor Vehicle Safety Standard MVSS 225 Child Tether Restraint Anchorage system, Section S9.1, requires that latch wires be rigidly attached to the vehicle, preferably one on each side of the child seat. As disclosed by Youssef-Agha, et al. in U.S. Pat. No. 6,276,754, the child safety seat has a pair of latch mechanisms which lockingly engage the latch wires to secure the child safety seat to the seat of the vehicle. In the embodiments disclosed by Youssef-Agha, the latch wires are welded to a cross member. In an alternate embodiment known in the prior art, the latch wires 10 are attached to a cross member 12 as shown in FIG. 1. Each latch wire 10 is a U-shaped member having a pair of legs 14 which pass through holes 16 provided in the cross member 12. The end portions 18 of each of the legs 14 are bent to lie flat against the surface of the cross member 12 on the side opposite the transverse portion 20 of the U-shaped latch wire 10. The legs 14 do not have collars which engage the cross member 12 and limit the extent to which the end portions are received through the holes 16. The end portions 18 of the latch wire 10 are then welded to secure latch wire 10 to the cross member 12. Because the end portions 18 of the legs are bent prior to being inserted through the holes 16, the holes 16 have to be elongated to accept the bent end portions 18 therethrough. These elongated holes decrease the strength of the cross member 12. Further, it has been found that the welding of the latch wires 10 to the cross member 12 distort the cross member causing unacceptable assembly to assembly variations from a manufacturing point of view. This often requires reworking of the completed anchorage to meet product specifications. The invention is directed to an anchorage for a child safety seat in which the aforesaid problems are eliminated.

SUMMARY OF THE INVENTION

This invention relates to a restraint anchorage for a child safety seat for an automotive vehicle, the restraint anchorage having a cross member disposed behind a seat of the vehicle. The cross member is mountable to the floor of the vehicle or other structural member. At least one set of latch wires are attached to the cross members, each latch wire having a pair of legs joined at one end by a transverse cross bar. The ends of the legs are received through holes provided in the cross member. A collar is provided near the end of each leg which limits how much of the leg protrudes through the holes in the cross member. The length of the end of the leg that protrudes outside the cross member on the side opposite the collar is selected so that sufficient material is available to be peened over forming an enlarged head locking the latch wire to the cross member. The latch wires extend from the cross member into the crevice between the seat cushion and back rest of the seat where they are readily accessible through the crevice of the seat of the vehicle for latching a child safety seat thereto.

One advantage of the invention is that the welding of the latch wire to the cross member is eliminated.

Another advantage of the invention is that the warping or distortions of the transverse member encountered during welding are eliminated.

Still another advantage is that product quality control is significantly improved and rework eliminated.

Yet another advantage is that the latch wire may be plated, such as chrome-plated, prior to assembly improving cosmetic appearance, reducing plating costs and increasing wear and corrosion resistance.

And still another advantage is that the elimination of welding, the cross member may be made from steel, a structural plastic or a carbon fiber material.

These and other advantages will become more apparent from a reading of the detailed description in conjunction with the drawings.

BRIEF DESCRIPTION OF THE DRAWINGS

FIG. 1 is a rear view of a prior art welded assembly of a latch wire to a cross member;

FIG. 2 is a perspective view of the restraint anchorage;

DETAILED DESCRIPTION OF THE PREFERRED EMBODIMENT(S)

Figure 3:
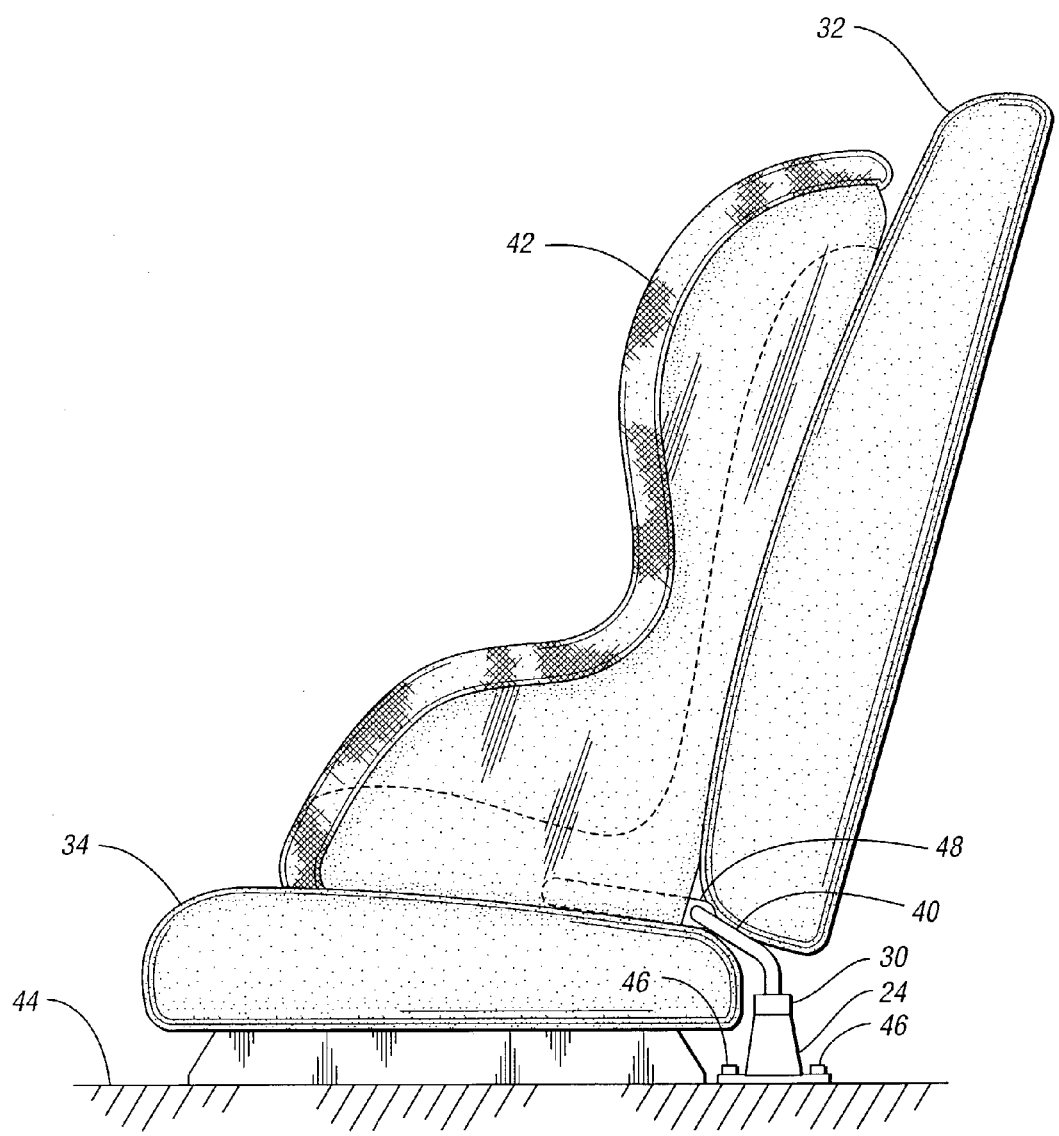
FIG. 3 is a side view showing a child safety seat attached to the restraint anchorage.

The anchorage 30 for a child seat safety restraint system according to the invention is shown on FIG. 2. The anchorage 30 comprises a cross-member 22 supported by three mounting brackets 24, 26 and 28 from a structural member of the vehicle (not shown), such as the floor behind the seat of the vehicle. It is to be understood that in many applications only two mounting brackets may be required. The cross member 22 may be made from steel, a structural plastic or a carbon fiber material. The cross member 22 may be a solid bar or a tubular member as illustrated in the drawings. A plurality of U-shaped latch wires 40 are attached to the cross member 22 at selected locations. The illustrated embodiment shows three pairs or sets of latch wires 40 indicative of three possible locations of a child safety restraint seat. These three locations are the left side of the seat, the right side of the seat and the center. It is to be understood that only two or possibly only one set of latch wires 40 may be attached to the cross member 22 if desired. The anchorage 30 is located behind the seat of the vehicle at a location such that the latch wires 40 extend forward in the crevice between the backrest 32 and the seat cushion 34 of the seat as shown in FIG. 3. The anchorage 30 may include pivots or other attachments, such as pivot 36, as may be desired. For example, the pivot 36 may be a pivot permitting a portion of the backrest 32 to be folded down to provide access into the trunk area from the passenger compartment of the vehicle. Alternatively, the pivot 36 may pivot for a foldable arm rest as is known in the art. The mounting brackets 24, 26 and 28, each have one or more bolt holes 38 facilitating the bolting of the anchorage to the vehicle.

FIG. 3 illustrates a child safety seat 42 attached to the seat of a vehicle. The base of the child safety seat rests on the seat cushion 34 while the back of the child safety seat rests against the back rest 32. The anchorage 30 is bolted to the floor 44 of the vehicle by means of bolts 46. The latch wires 40 as stated before extends forward between the back rest 32 and the seat cushion 34. The child safety seat 42 includes an extendable latch mechanism 48 which is capable of latching onto the latch wires 40. The latch mechanism 48 may be spring loaded which retracts and locks when the latch mechanism lockingly engages the latch wire 40 to pull the child safety seat 42 in place or the latch mechanism may be manually activated to pull the child safety seat in place.

Figure 4:
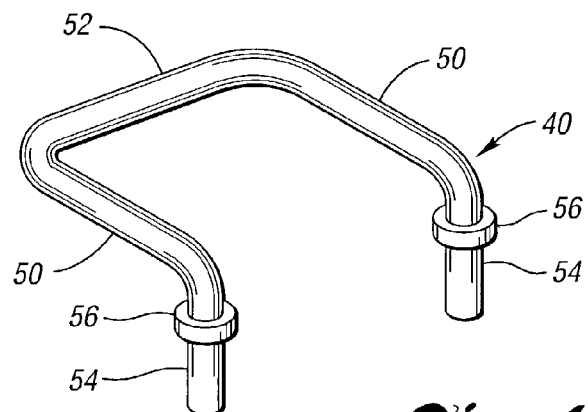
FIG. 4 is a perspective view of a latch wire according to the invention.

FIG. 4 is a perspective showing the details of the latch wire 40. The latch wire 40 has a U-shaped configuration having a pair of spatially separated legs 50 joined at one end by an integral transverse latch bar 52. The end portions 54 of each leg 50 is of such a slope to facilitate correct attachment of the child seat. These end portions may be bent at an angle ranging up to 90° or straight depending upon the vehicle in which the anchorage is to be used. Each end portion 54 has a rigid collar 56 which may be formed by cold heading or any other process known in the art.

Figure 5:
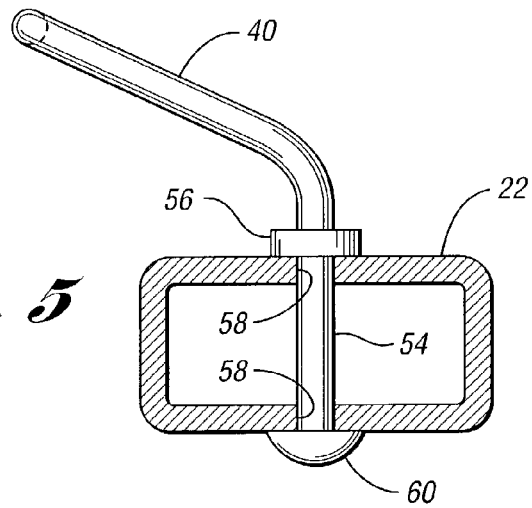
FIG. 5 is a cross-sectional side view of a first embodiment.

The attachment of the latch wire to the cross member 22 is illustrated in FIG. 5. The cross member 22 has two pair of holes 58 for each latch wire 40 through which the end portions 54 of the latch wire 40 pass. The length of the end portion 54 beyond the collar 56 is selected so that end may be peened over to form an enlarged head 60 locking the latch wire 40 to the cross member 22.

Figure 6:
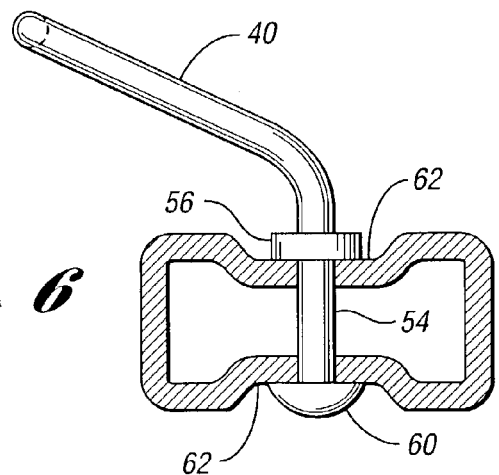
FIG. 6 is a cross-sectional side view of a preferred embodiment.

FIG. 6 show an alternate embodiment in which dimples or depressions 62 are formed in the cross member 22 circumscribing each of the holes 58. The depressions 62 are large enough and deep enough so that the top of the collar 56 and the crown of the enlarged head 60 are substantially coplanar with the upper and lower surfaces of the cross member. This prevents the enlarged head 60 and the collar 56 from protruding making the anchor 30 aesthetically cleaner.

One advantage of the anchorage according to the invention is that the holes in the cross member are smaller which makes the cross member structurally stronger. This permits the cross member to be made smaller and lighter while still retaining the desired strength. Another advantage is that all welding is avoided eliminating the warping or other distortion of the completed anchorage making it structurally consistent and eliminating the need for reworking to conform to specifications. Still another advantage is that the latch wire may be plated prior to assembly increasing its cosmetic appearance, increasing its wear resistance and making them corrosion resistant.

Due to the elimination of welding, the cross member may be made from a structural plastic material or a carbon fiber material. The use of a structural plastic or carbon fiber material will reduce weight, provide increased strength and may be less costly to manufacture.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A restraint anchorage for a child safety seat for an automotive vehicle comprising:
   an elongated, tubular cross member having at least two pairs of holes provided therethrough;
   at least two mounting brackets attached to the cross member for securing the cross member at a location behind a seat of the vehicle;
   at least one pair of latch wires, each latch wire of the pair of latch wires having a pair of spatially separated legs joined at one end by a transverse latch bar to which the child safety seat can be attached, each leg having an end portion passing through a respective one hole of said at least two pairs of holes provided through the cross member, each leg further having an enlarged head provided on the end opposite the transverse latch bar to secure the latch wire to the cross member and to prevent it from being disengaged from the cross member by a force applied to the transverse latch bar.

2. The restraint anchorage of claim 1 wherein the end portion of each leg of each latch wire further has a collar which engages the cross member on the side opposite the side engaged by the enlarged head.

3. The restraint anchorage of claim 2 wherein the end portion may be bent at an angle between 0° to 90°.

4. The restraint anchorage of claim 2 wherein the cross member further has depressed regions circumscribing the holes though the cross member.

5. The restraint anchorage of claim 2 wherein the cross member has depressed regions circumscribing the holes through the cross member on both sides of the cross member.

6. The restraint anchorage of claim 2 wherein the seat has a seat cushion and a back rest, the end portions of the legs of the latch wire are bent at an angle so that the transverse latch bar is disposed in a crevice formed between the seat cushion and the back rest of the seat of the vehicle.

7. The restraint anchorage of claim 1 wherein the cross member has at least four pairs of holes therethrough and the at least one pair of latch wires comprises at least two pairs of latch wires.

8. The restraint anchorage of claim 1 wherein the cross member has six pairs of holes therethrough and the at least one pair of latch wires is three pairs of latch wires.

9. A child safety restraint system for an automotive vehicle having a seat, the seat consisting of a seat cushion and a back rest, the child safety restraint system comprising:
   an elongated, tubular cross member having at least two pairs of spatially separated holes provided therethrough,
   at least two mounting brackets attached to the cross member for securing the cross member to a structural member of the vehicle at a location behind the vehicle's seat,
   at least two latch wires, each latch wire of the at least two latch wires having a pair of spatially separated legs, each leg having an end portion received in a corresponding hole of the pair of holes provided through the cross member, the legs being joined at one end by a transverse latch bar, each latch wire extending forward between the seat cushion and the back rest of the seat of the vehicle, each of the legs further having an enlarged head provided at the end protruding through the holes in the cross member, the enlarged head preventing the latch wire from being disengaged from the cross member by a force applied to the transverse latch bar; and a child restraint seat adopted to be disposed on the seat of the vehicle, the child seat having at least two latch mechanisms, one on each side, each latch mechanism engageable with a selective one of the at least two latch wires to secure the child restraint seat to the seat of the vehicle.

10. The restraint system of claim 9 wherein each leg of the latch wire further has a collar engageable with the surface of the cross member on the side opposite the enlarged head to lock the latch wire to the cross member between the collar and the enlarged head.

11. The restraint system of claim 10 wherein the enlarged head is a peened head formed at the end of the leg protruding through the holes in the cross member.

12. The restraint system of claim 10 wherein the at least two pairs of holes provided through the cross member comprises four pairs of holes and said at least two latch wires comprises four latch wires.

13. The restraint system of claim 10 wherein the at least two pairs of holes provided through the cross member comprises six pairs of holes and the at least two latch wires comprises six latch wires.

14. The restraint system of claim 10 wherein a depressed region is provided in the cross member about each hole provided therethrough.

15. The restraint system of claim 9 wherein the end portion of each leg of the latch wire is bent at an angle ranging from 0° to 90°.

16. A latch wire for a child safety seat restraint system for a vehicle having a seat, a seat restraint attachable to a tubular cross member mounted to the vehicle behind the seat, the latch wire comprising a pair of spatially separated legs joined at one end by a transverse latch bar, each leg has an end portion at the end opposite the latch bar and the end portions each having a collar limiting the length of the legs protruding through holes provided in at least a first surface of the tubular cross member, the amount of the legs protruding through the holes is selected to permit the ends to be peened to form an enlarged head locking the latch wire to the cross member, wherein the seat has a seat cushion and a back rest, said end portions of said legs are bent to extend into a crevice formed between the seat cushion and the back rest of the seat of the vehicle.

* * * * *